(12) United States Patent
Oppermann

(10) Patent No.: US 7,320,396 B2
(45) Date of Patent: Jan. 22, 2008

(54) LOAD CARRIER FOR USE WITH WORK PIECE CONVEYING APPARATUS

(75) Inventor: Walter Oppermann, Münden (DE)

(73) Assignee: EWAB Holding AG, Zug (CH)

(*) Notice: Subject to any disclaimer, the term of this patent is extended or adjusted under 35 U.S.C. 154(b) by 271 days.

(21) Appl. No.: 11/262,415

(22) Filed: Oct. 28, 2005

(65) Prior Publication Data
US 2006/0090987 A1 May 4, 2006

(30) Foreign Application Priority Data
Oct. 30, 2004 (EP) .................. 04025852

(51) Int. Cl.
- B65G 17/12 (2006.01)
- B65G 19/20 (2006.01)
- B65G 17/02 (2006.01)

(52) U.S. Cl. ............... 198/867.13; 104/165; 104/172.3

(58) Field of Classification Search ........... 198/867.13, 198/165, 172.3
See application file for complete search history.

(56) References Cited

U.S. PATENT DOCUMENTS

| | | | | |
|---|---|---|---|---|
| 4,718,349 A | * | 1/1988 | Wahren | 104/165 |
| 5,372,240 A | * | 12/1994 | Weskamp | 198/465.1 |
| 5,579,695 A | * | 12/1996 | Cockayne | 104/140 |
| 6,102,194 A | * | 8/2000 | Charny | 198/795 |
| 7,263,799 B2 | * | 9/2007 | Van Zanten | 47/39 |

FOREIGN PATENT DOCUMENTS

| | | |
|---|---|---|
| CH | 669 167 A5 | 2/1989 |
| EP | 0 163 617 A2 | 12/1985 |
| WO | WO 94/26637 | 11/1994 |

* cited by examiner

*Primary Examiner*—Mark A Deuble
(74) *Attorney, Agent, or Firm*—Thomas, Kayden, Horstemeyer & Risley LLP

(57) ABSTRACT

A load carrier is designed for use with a work piece conveying apparatus, the work piece conveying apparatus including a conveyor chain for conveying a plurality of load carriers via transfer of friction forces onto the load carriers and a guiding rail for guiding and supporting the conveyor chain and the load carriers, the conveyer chain running in a recessed track of the guiding rail and the guiding rail having a supporting surface laterally extending on both sides of the recessed track. The load carrier comprises support rollers designed and arranged for rolling on the supporting surface on both sides of the recessed track of the guiding rail; and a front guiding foot and a rear guiding foot designed and arranged for engaging into the recessed track of the guiding rail, at least one of said guiding feet not contacting the conveyor chain such that said load carrier can be tilted between a first position in which only said at least one guiding foot not contacts the conveyor chain and in which the other of said guiding feet contacts the conveyor chain, and a second position in which none of said guiding feet contacts the conveyor chain.

19 Claims, 3 Drawing Sheets

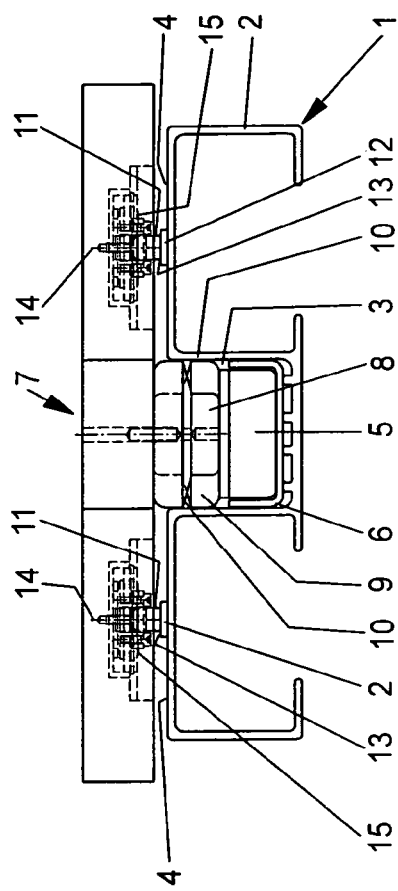
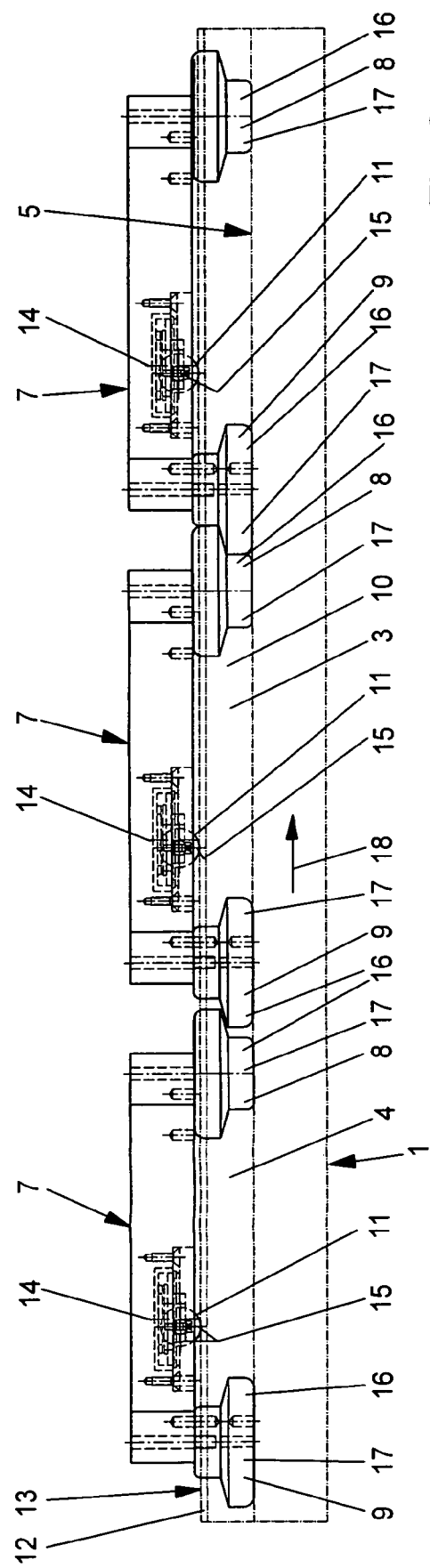

LOAD CARRIER FOR USE WITH WORK PIECE CONVEYING APPARATUS

CROSS REFERENCE TO RELATED APPLICATIONS

This application claims priority to co-pending European Patent Application No. 04 025 852.7 entitled "Werkstückträger für eine Werkstückfördereinrichtung mit einer Führungsbahn", filed on Oct. 30, 2004.

FIELD OF THE INVENTION

The present invention generally relates to a load carrier designed for use with a work piece conveying apparatus. Further, the invention relates to a work piece conveyor system having a work piece conveying apparatus and a plurality of load carriers. Particularly, the invention relates to load carriers designed for use with and work piece conveyor systems having a work piece conveying apparatus including a conveyor chain for conveying a plurality of load carriers via transfer of friction forces onto the load carriers and a guiding rail for guiding and supporting the conveyor chain and the load carriers, the conveyer chain running in a recessed track of the guiding rail and the guiding rail having a supporting surface laterally extending on both sides of the recessed track.

BACKGROUND OF THE INVENTION

A work piece conveyor system having a plurality of load carriers and a work piece conveying apparatus is known from EP 0 163 617 A2. The work piece conveying apparatus includes a conveyor chain which runs within a recessed track of a guiding rail, and which is supported at the bottom of the recessed track of the guiding rail. Each of the load carriers comprises a front guiding foot and a rear guiding foot, which both stand on the conveyor chain within the recessed track so that the conveyor chain supports the weight of the load carriers and conveys the load carriers via transfer of friction forces. Side walls of the recessed track of the guiding rail guide both the conveyor chain and the guiding feet of the load carriers standing on the conveyor chain, and thus also the load carriers themselves. In processing stations the load carriers are stopped for processing work pieces loaded onto the load carriers. A number of load carriers may be queuing in front of such a processing station. The conveyer chain within the recessed track goes on running beneath the guiding feet of the load carriers, as the conveyor chain is provided for a plurality of processing stations, i.e. for transporting all work pieces on all load carriers which are presently not waiting in front of a processing station over the entire length of the conveyor chain. To reduce the force applied to a processing station by a plurality of load carriers queuing in front of the processing station and standing on the conveyor chain running beneath them, it is known from EP 0 163 617 A2 to provide ring-shaped buffers made of elastic material between the single load carriers. The ring-shaped buffers are deformed by the guiding feet bumping onto each other in such a way that the buffers lean against the side walls of the recessed track of the guiding rail and that they, thus, provide for a support of the load carriers at the guiding rail. The transfer of friction forces from the conveyor chain onto the guiding feet of the load carriers however, is not interrupted here. The forces applied by the load carriers are also still the same, but they are supported over a longer area of the guiding rail and they do not solely rest on the respective processing station in front of which the load carriers are queuing. The friction forces applied by the conveyor chain onto the single load carriers are considerable as the load carriers, in vertical direction, are only supported via their guiding feet by the conveyor chain. This results in high forces normal to the contacting surface between the guiding feet and the conveyor chain, particularly with heavy work pieces on the load carriers.

In another known work piece conveyor system having a plurality of load carriers and the same work piece conveying apparatus as described before, each load carrier has one additional support roller additionally supporting the load carrier at the guiding rail. The support roller rotating about a horizontal rotation axis rolls on a supporting surface provided by the guiding chain on one side of the recessed track. With regard to the direction of the conveyor chain, the support roller is arranged between the two guiding feet. Thus, there is a three point support of each load carrier at the guiding rail. In this three point support the weight forces onto the guiding feet to be supported by the conveyor chain are reduced, and thus the friction forces transferred from the conveyor chain onto the load carriers may also be reduced. Further, the load carriers are stabilized about the longitudinal axis of the conveyor chain so that the center of weight of the load carriers with and without work piece no longer needs to be exactly located above the conveyor chain but may also be laterally offset. However, the laterally offset support roller results into moments of force about a vertical axis onto the load carriers. These moments of force are to be supported by guiding the guiding feet within the recessed track of the guiding rail. To reduce these moments of force, the supporting roll is swiveling with regard to the remainder of the load carrier about a vertical swiveling axis running at a distance to its horizontal rotation axis. For reducing the force applied to a processing station by a plurality of load carriers queuing in front of the processing station, these known load carriers comprise a device which raises the two guiding feet of each load carrier in the queue away from the conveyor chain which has been in contact with both guiding feet of each load carrier up to then. To this end a front and a rear lever element are provided at each load carrier, each of which lever elements is swiveling about a horizontal swiveling axis running across the guiding rail. With a single load carrier the lever elements have inclined orientations and do not yet contact the guiding rail. With queuing load carriers contacting each other via their lever elements, the lever elements are pressed downwards swiveling about their swiveling axes, until they touch the guiding rail besides the recessed track and raise the load carriers until their guiding feet are lifted away from the conveyor chain. As soon as the guiding feet are no longer in contact with the conveyor chain, no further transfer of friction forces from the conveyor chain onto the load carrier takes place. However, the lever arms only arranged on one side of the recessed track also result into moments of force about onto the load carriers a vertical axis, as soon as the lever arms lean against the supporting surface, even if rollers are arranged at their ends which reduce the friction between the lever arms and the supporting surface. To lift both guiding feet away from the conveyor chain both the front and the rear lever element has to be pressed down, which only occurs with the two lever arms of a load carriers, if these lever arms are pressed together by the lever arms of a preceding and a succeeding load carrier within the same queue. I. e. with a load carrier bumping onto a queue of load carriers only the front guiding foot is lifted away from the conveyor chain via the front lever element, and the conveyor chain still applies friction forces onto the rear guiding foot. Further, it takes some efforts to provide the lever arms at the load carriers and to care for their full function.

Thus, there is still a need for a work piece conveyor system in which the load carriers are of simple construction, in which no moments of force are applied to the load carriers about a vertical axis, and in which nevertheless the forces onto a processing station applied by a plurality of load carriers queuing in front of the processing stations can effectively be reduces.

SUMMARY OF THE INVENTION

In one aspect, the present invention provides a load carrier designed for use with a work piece conveying apparatus, the work piece conveying apparatus including a conveyor chain for conveying a plurality of load carriers via transfer of friction forces onto the load carriers and a guiding rail for guiding and supporting the conveyor chain and the load carriers, the conveyer chain running in a recessed track of the guiding rail and the guiding rail having a supporting surface laterally extending on both sides of the recessed track, said load carrier comprising: support rollers designed and arranged for rolling on the supporting surface on both sides of the recessed track of the guiding rail; and a front guiding foot and a rear guiding foot designed and arranged for engaging into the recessed track of the guiding rail, at least one of said guiding feet not contacting the conveyor chain such that said load carrier can be tilted between a first position in which only said at least one guiding foot not contacts the conveyor chain and in which the other of said guiding feet contacts the conveyor chain, and a second position in which none of said guiding feet contacts the conveyor chain.

In another aspect, the present invention provides a work piece conveyor system having a work piece conveying apparatus and a plurality of load carriers, the work piece conveying apparatus including: a conveyor chain for conveying the load carriers via transfer of friction forces onto the load carriers, and a guiding rail for guiding and supporting the conveyor chain and the load carriers, the conveyer chain running in a recessed track of the guiding rail, and the guiding rail having a supporting surface laterally extending on both sides of the recessed track, each of the load carriers comprising: support rollers rolling on the supporting surface on both sides of the recessed track of the guiding rail; and a front guiding foot and a rear guiding foot engaging into the recessed track of the guiding rail, at least one of the guiding feet not contacting the conveyor chain such that the load carrier can be tilted between a first position in which only the at least one guiding foot does not contact the conveyor chain and in which the other of the guiding feet contacts the conveyor chain, and a second position in which none of the guiding feet contacts the conveyor chain.

GENERAL DESCRIPTION OF THE INVENTION

The new load carrier has support rollers for rolling on the supporting surface on both sides of the recessed track of the guiding rail. This measure alone results into a reduction of any moments of force onto the load carrier about a vertical axis in that the effects of both supporting rolls at least partially compensate for each other. Further, the support rollers broaden the support basis of the load carrier at the guiding rail resulting in a particular high stability with regard to tilting about the longitudinal axis of the guiding rail. At the same time, the relative heights of the two supporting rollers and the two guiding feet with regard to the relative heights of the conveyor chain and the supporting surface are selected in such a way that at maximum one of the guiding feet of the load carrier is in contact with the conveyor chain. The other guiding foot which never gets in contact with the conveyor chain only serves for laterally guiding the load carrier at the sidewall of the recess track of the guiding rail in the new load carrier.

The force normal to the contact surface between the conveyor chain and the guiding foot of the load carrier contacting the conveyor chain can be adjusted by means of positioning the centre of weight of the load carrier and of the work piece supported by the load carrier with regard to the support rollers and with regard to the guiding foot getting into contact with the conveyor chain. Moving the position of the center of weight away from a virtual straight line defined by the supporting rollers and towards the guiding foot getting into contact with the conveyor chain results in an increase of the force normal to the contact surface; whereas moving the center of weight in the opposite direction results into a decrease of the force normal to the contact surface. This applies regardless of the total weight of the load carrier. Thus, the force normal to the contact surface between the conveyor chain and the guiding foot contacting the conveyor chain can be adjusted independently on the total weight of the load carrier including a work piece carried by the load carrier. Particularly, the friction forces applied by the conveyor chain onto the load carrier which directly depend on the forces normal to the contact surface between the conveyor chain and the guiding foot contacting the conveyor chain can be limited to a necessary minimum even with very heavy load carriers and work pieces.

This alone reduces the force applied by a number of load carriers queuing in front of a processing station as, even without further measures reducing this force, each load carrier only applies a minimum force onto the processing station.

As already indicated before, always the same guiding foot of the new load carrier contacts the conveyor chain, whereas the other guiding foot never contacts the conveyor chain. This is a result of the fact that the center of weight of the load carrier with and without a work piece supported by the load carrier is preferably located within a virtual triangle defined by the supporting rollers and one of the guiding feet which is the guiding foot contacting the conveyor chain so that instabilities with regard to the position of the load carrier about a straight line connecting the supporting rollers are avoided.

Further it is preferred, if only always the front guiding of the new load carrier contacts the conveyor chain, as this corresponds to a towing arrangement with regard to the supporting rollers in applying a conveying force from the conveyor chain onto the load carrier. Such a towing arrangement is preferred over a pushing arrangement for stability reasons. Generally, however, a pushing arrangement in which always only the rear guiding foot contacts the conveyor chain is also possible.

If the guiding foot contacting the conveyor chain is arranged at a greater distance to a straight line connecting the supporting rollers than the other guiding foot, the triangle within which the center of weight of the load carrier may be arranged in horizontal direction is particularly big. Further the lever arm ratios about the straight line connecting the supporting rollers are particularly well suited for realizing a reduction of the forces applied onto a processing station by queuing load carriers in a simple way.

To the end of reducing the forces applied by queuing load carriers complementary guiding surfaces are provided at the front side and the rear side of the load carrier which, upon the load carrier bumping onto another load carrier, lift the guiding foot contacting the conveyor chain away from the conveyor chain. Because of the comparatively great distance of the guiding foot contacting the conveyor chain to the virtual straight line connecting the support rollers, this requires only a minimum tilting movement of the load carrier about the straight line connecting the support rollers, as lifting the guiding foot by a few tenth of a millimeter is sufficient in most cases.

If the complementary guiding surfaces have an average inclination of typically 10° to 30°, it is assured that a load carrier bumping onto a standing load carrier is not stopped instantaneously but reduced in speed over a certain distance. Further it is assured that then, when a queue is dissolved one load carrier after the other contacts the conveyor chain via its one guiding foot again and is thus conveyed again. The complementary guiding surfaces slide off each other as soon as the respective preceding load carrier moves on. This results into a separation of the load carriers in the conveying direction. This separation has the advantage that the load carriers are not altogether stopped at the same time, if they bump into a new queue, but are again reduced in speed one after the other. Thus, the conveyor chain is both protected against load peaks in braking and accelerating a plurality of load carriers, even if these load carriers are closely following each other.

The stress on the conveyor chain is always quite low with the new load carrier as the main part of the weight of the load carrier is supported via the support rollers at the supporting surfaces of the guiding rail, i. e. not via the conveyor chain.

It is particularly preferred, if the complementary guiding surfaces are provided by the guiding feet of the load carrier. Here, it is an advantage that the guiding foot not contacting the conveyor chain is closer to the virtual straight line connecting the supporting rollers in that it is not swiveled downwards by a front guiding foot of a succeeding load carrier about the line connecting the supporting rollers or even pressed onto the conveyor chain. Instead, the front guiding foot of the load carrier bumping onto the resting rear guiding foot is lifted away from the conveyor chain. Even the tilting motion of the bumping load carrier does not have the effect that the rear guiding foot of the bumping load gets into contact with the conveyor chain.

The complementary guiding surfaces may be cone shaped, and they may be provided by turned parts of the guiding feet. Such guiding feet can be produced at comparatively low cost. Although the contact area of cone-shaped guiding surfaces is only a line, no wear of these guiding surfaces is to be expected as long as the guiding feet are as usual made of wear-resistant material.

Particularly, it is preferred, if both guiding feet of a load carrier are made of identical parts which are arranged in opposite vertical orientations.

The support rollers of the new load carrier are preferably swiveling with regard to the remainder of the load carrier about vertical swiveling axes which run at a distance to their horizontal rotation axes. This allows for a transverse force-free orientation of each support roller in the direction of motion of the load carrier with regard to the guiding rail which is determined by the guiding feet engaging into the recessed track of the guiding rail.

The work piece conveying apparatus which is used in connection with the new load carrier has supporting surfaces for supporting the support rollers of the load carrier on both sides of its recessed track. To provide wear-resistant supporting surfaces with a guiding rail mainly consisting of an extruded body of aluminium, the supporting surfaces may be formed by runways made of steel which are placed on top of the extruded body made of aluminium on both sides of the recessed track of the guiding rail. The runways may also be made of another wear-resistant material. In another aspect they are made of a noise-reducing material. If this noise reducing material tends to wear, the runways are attached to the extruded body made of aluminum in an exchangeable way.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1 is a longitudinal section through a guiding rail of a work piece conveying apparatus with one load carrier guided by the guiding rail.

FIG. 2 shows a number of load carriers following each other along the guiding rail of FIG. 1, the contours of which are depicted in dashed lines.

DETAILED DESCRIPTION

Figure 3:
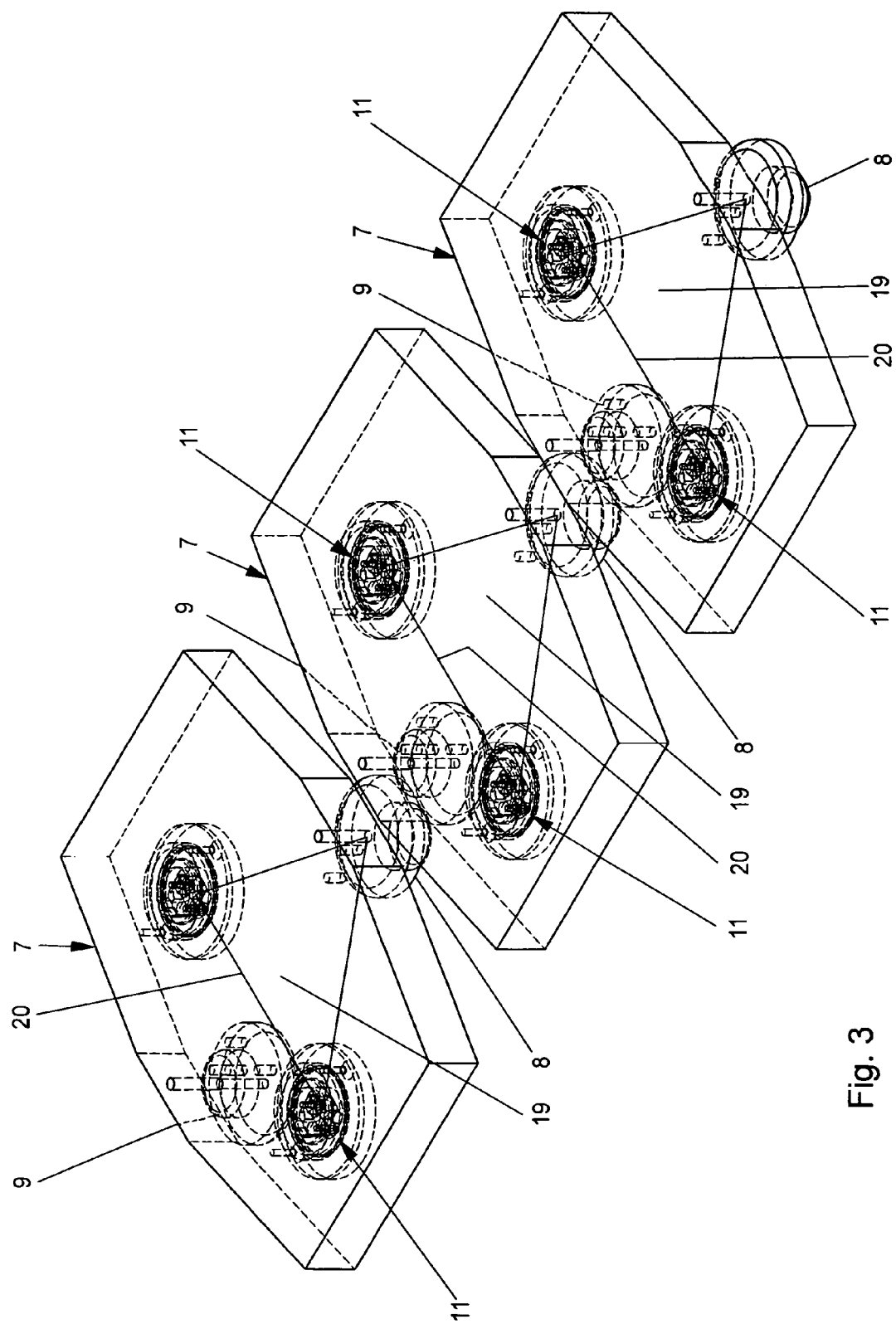
FIG. 3 is a perspective view on the load carriers of FIG. 2 without the guiding rail.

Referring now in greater detail to the drawings, FIG. 1 illustrates a guiding rail which is mainly consisting of a profiled body 2 made of aluminum. The profiled body 2 is extruded from aluminum. The extruded body 2 is the main body of the guiding rail 1 and provides a recessed track 3 located between horizontal lateral phases 4. At the bottom of the recessed track a conveyor chain 5 runs within a tub 6 which is inserted into the recessed track 3 and which has a higher wear-resistance than the body 2 of aluminum to avoid wear of the profiled body 2 by the conveyor chain 5 running through the recessed track 3. The conveyor chain 5 transfers friction forces onto a load carrier 4 which has two guiding feet 8 and 9 engaging into the recessed track 3. The guiding feet 8 and 9 provide for laterally guiding the load carrier 7 with regard to the guiding rail 1 in that they rest on sidewalls 10 which laterally delimit the recessed track 3. Only the guiding foot 8 which is the front guiding foot with regard to the conveying direction contacts the conveyor chain 5, whereas the rear guiding foot 9 always ends above the conveyor chain 5. This will be discussed in more detail together with FIG. 4. The weight of the load carrier 7 and of a work piece supported by the load carrier 7, which is not depicted here, is supported not only by the front guiding foot 8 but also by support rollers 11 which are provided on both sides of the recessed track 3 and which roll on runways 12. The runways 12 are placed on top of the lateral faces of the body 2 made of aluminum and provide supporting surfaces 13 for the supporting rollers 11. These supporting surfaces 13 can extend over the entire lateral faces 4; particularly along curves of the guiding rail 2, they are typically much broader than depicted in FIG. 2.

The side view of a plurality of load carriers according to FIG. 2 shows that the support rollers 11 of the load carriers 7 are closer to their rear guiding feet 9 than to their front guiding feet 8. Further, it is indicated that the supporting rollers 11 are swiveling about vertical swiveling axes 14 with regard to the remainder of the load carrier 7, the swiveling axes 14 running at a distance in front of the horizontal rotation axes of the support rollers 11. Thus, the supporting rollers 11 may passively align to the actual direction of motion of the load carrier with regard to the guiding rail 1, which is determined by the guiding feet 8 and 9 engaging into the recessed track 3. From FIG. 2 it can further be seen that the guiding feet 8 and 9 are constructed of identical parts 16 which are turned parts made of steel and have a polished and hardened surface 17. However, the parts 16 are provided in different vertical orientations for the guiding feet 8 and 9, i. e. the parts 16 in the rear guiding feet 9 are turned by 180° about a horizontal axis with regard to the parts 16 in the front guiding feet 8. Further, the rear guiding feet 9 are higher than the front guiding feet 8 as only the front guiding feet 8 are indented to get into contact with the conveyor chain 5 which conveys the load carriers 7 via friction forces in the direction of an arrow 18. Even the contact of the front guiding foot 8 to the guiding chain 5 is interrupted, if the load carriers 7 are bumping onto each other, i. e., if they are queuing as depicted in FIG. 2. Such a queue can for example occur in front of a processing station for the work pieces carried by the load carriers. The first load carrier 7 is stopped to process the work piece transported on it, and the other load carriers bump on it. This results into a force onto the processing station as long as the conveyor chain 5 applies friction forces onto the queuing load carriers 7. How this is avoided here will be explained in detail in connection with FIG. 4.

FIG. 3 is a perspective picture of the load carriers 7 according to FIG. 1 without the guiding rail 1. FIG. 3 allows for the explanation of a horizontally oriented triangle 19 over which the centre of weight of the respective load carrier 17 has to be located to provide for a stabile support of the load carrier at the guiding rail. The corners of the triangles 19 are defined by the support rollers 11 and the front guiding feet 8. The exact position of the centre of weight within the triangle 19 determines which part of the weight of the load carriers is supported by the support rollers 11 and which part rests on the conveyor chain as a force normal to a contact surface between the front guiding foot 8 and the conveyor chain arranged beneath the guiding foot 8. The triangle 19 can be extended by increasing the distance of the front guiding foot 8 to the straight line 20 connecting the support rollers 11 and by increasing the distance of the support rollers 11 with regard to each other. Within the triangle 19 even a displacement of the centre of weight by placing a work piece onto the load carrier 7 causes no problems. The higher distance of the guiding foot 8 to the straight line 20 also ensures that the guiding foot 9 never contacts the conveyor chain running underneath, because even lifting the guiding foot 8 away from the conveyor chain does not result into lowering the guiding foot 9 into contact with the conveyor chain.

Figure 4:
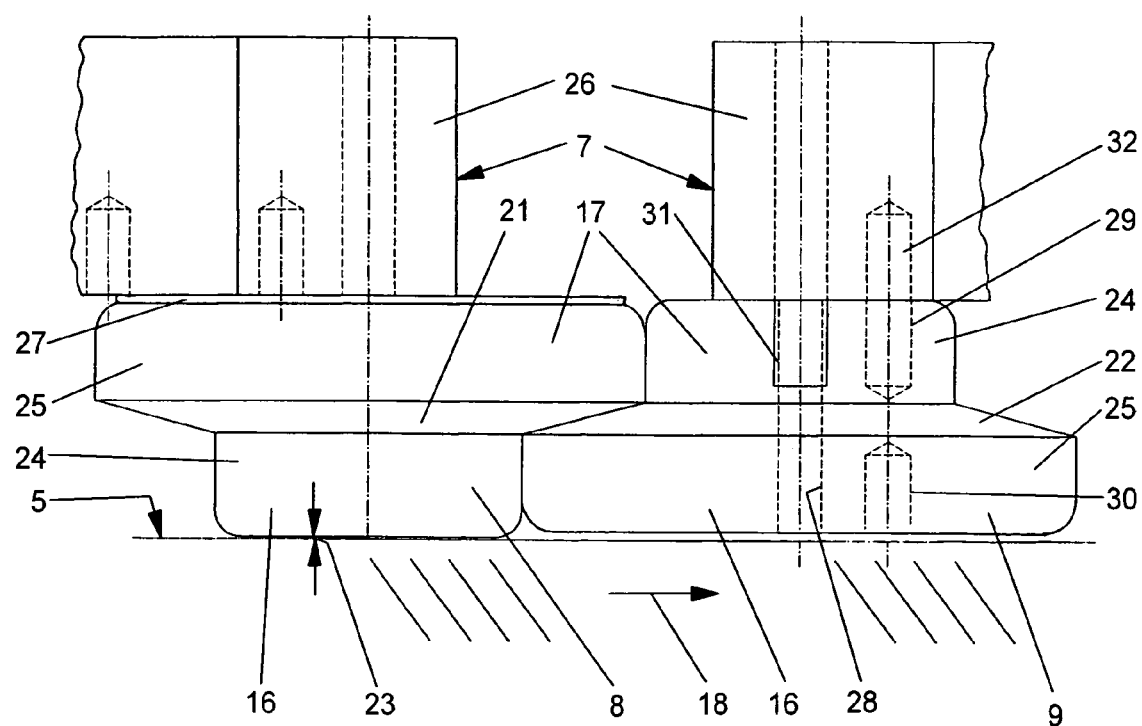
FIG. 4 shows the rear guiding foot of a preceding load carrier and the front guiding foot of a load carrier bumping onto the preceding load carrier both with regard to the upper surface of a conveyor chain.

FIG. 4 shows in detail how the front guiding foot 8 of a load carrier 7 bumping onto a preceding load carrier 7 is lifted by the rear guiding foot 9 of the preceding load carrier 7 away from the conveyor chain 5, so that no more friction forces are transferred from the conveyor chain 5 onto the guiding foot 8. To this end, complementary guiding surfaces 21 and 22 are provided at the surfaces 17 of the guiding feet 8 and 9. The guiding surface 21 at the guiding foot 8 is an envelope of a cone pointing downwards at a slant angle, which hits onto an envelope of a cone as the guiding surface 22 principally being identical to the guiding surface 21 but pointing upwards at a slant angle, and which slides upwards on the guiding surface 22 upon the load carriers bumping onto each other. In this way the guiding foot 8 is lifted away from the conveyor chain 5 at a distance 23 which hinders the further transfer of friction forces from the conveyor chain 5. The slope of the guiding surfaces 21 and 22 is selected in such a way that the guiding foot 8 by its own does not subsequently slide off the guiding foot 9 by means of a rearward motion of the rear load carrier 7 so that it gets into contact with the conveyor chain 5 again. Instead, the guiding feet 8 and 9 only get away from each other, when the preceding load carrier 7 is moved away by the conveyor chain 5, i. e. when the guiding foot 9 is pulled away beneath the guiding foot 8. Only then, the guiding foot 8 contacts the conveyor chain 5 again. This automatically results in a certain distance between the load carriers 7 upon dissolving of a queue. Because of the lever arm ratios already explained, in which each rear guiding foot 9 is closer to the straight line connecting the supporting rollers of a load carrier 7 than the front guiding foot, it is excluded that the front guiding foot 8 of the load carrier 7, which is the first one in the conveying direction according to arrow 18 (not depicted here) is lifted away from the conveyor chain 5, so that it is moved on as soon as its way is free again. The only line-shaped contact between the guiding surfaces 21 and 22 having the shape of envelopes on cones causes no problems because of the hardened surface 17 of the parts 16 used for both guiding feet 8 and 9. Above and beneath the guiding surfaces 21 and 22, the guiding feet 8 and 9 have areas 24 of smaller diameter and areas 25 of larger diameter. The areas 25 of larger diameter care for laterally guiding the load carriers 7 at the sidewalls of the recessed track in the guiding rail. The area 24 of the front guiding foot 8 contacts the conveyor chain 5 via its underside, and it has a slightly longer vertical extension than the areas 25 so that the area 25 at the rear guiding foot 9 which points downwards does not contact the conveyor chain 5. Upon queuing of load carriers 7, always one area 24 of the one guiding foot 8 or 9 at the end rests against an area 25 of the other guiding foot 9 or 8. To compensate for the difference in vertical extension between the areas 24 and 25, a washer 27 is arranged between the guiding foot 8 and the main body 26 of the respective load carrier. Such a compensation of heights can also be accomplished by other measures. For example, the parts 16 of the guiding feet 8 and 9 may be slightly different. FIG. 4 shows that each of the parts 16 forming the guiding fees 8 and 9 has a fastening thread 28 as well as drilled holes 29 and 30 for being non-rotatably attached to the main body 26 of the respective load carrier 7. A fastening screw engages the fastening thread. A pin 32 serving as a rotation stop extends from the main body 26 into that drilled hole 29 or 30 pointing upwards.

Many variations and modifications may be made to the preferred embodiments of the invention without departing substantially from the spirit and principles of the invention. All such modifications and variations are intended to be included herein within the scope of the present invention, as defined by the following claims.

The invention claimed is:

1. A load carrier designed for use with a work piece conveying apparatus, the work piece conveying apparatus including a conveyor chain for conveying a plurality of load carriers via transfer of friction forces onto the load carriers and a guiding rail for guiding and supporting the conveyor chain and the load carriers, the conveyer chain running in a recessed track of the guiding rail and the guiding rail having a supporting surface laterally extending on both sides of the recessed track, said load carrier comprising:
   support rollers designed and arranged for rolling on the supporting surface on both sides of the recessed track of the guiding rail; and
   a front guiding foot and a rear guiding foot designed and arranged for engaging into the recessed track of the guiding rail, at least one of said guiding feet not contacting the conveyor chain such that said load carrier can be tilted between
      a first position in which only said at least one guiding foot not contacts the conveyor chain and in which the other of said guiding feet contacts the conveyor chain, and
      a second position in which none of said guiding feet contacts the conveyor chain.

2. The load carrier of claim 1, wherein said other of said guiding feet contacting the conveyor chain in the first position is always a same one of said guiding feet.

3. The load carrier of claim 2, wherein said same one of said guiding feet is said front food.

4. The load carrier of claim 2, wherein a center of mass of said load carrier has a horizontal position, both with or without a work piece being placed on the load carrier, which is located within a virtual triangle defined by said supporting rollers and said other of said guiding feet contacting the conveyor chain.

5. The load carrier according to claim 2, wherein the load carrier is tilting about a virtual straight line defined by said supporting rolls.

6. The load carrier of claim 5, wherein said other of said guiding feet contacting the conveyor chain is arranged at a greater distance to the virtual straight defined by said supporting rolls than said at least one guiding foot never contacting the conveyor chain.

7. The load carrier according to claim 2, wherein complementary guiding surfaces are provided at the front side and at the rear side of said load carrier, the complementary guiding surfaces being designed and arranged for, upon said load carrier bumping onto another identical load carrier, lifting said other of said guiding feet of said load carrier away from the conveyor chain.

8. The load carrier according to claim 7, wherein said complementary guiding surfaces are located at said front guiding foot and said rear guiding foot.

9. The load carrier according to claim 8, wherein said complementary guiding surfaces located at said guiding feet have the shapes of envelopes of cones.

10. The load carrier according to claim 9, wherein said guiding feet comprise turned parts having said complementary guiding surfaces.

11. The load carrier according to claim 10, wherein said turned parts having said complementary guiding surfaces of said front foot and said rear foot are identical but arranged in opposite vertical orientations.

12. The load carrier according to claim 1, wherein each of said supporting rollers having a horizontal rotation axis is swiveling about a vertical swiveling axis which runs at a distance to its rotation axis.

13. A work piece conveyor system having a work piece conveying apparatus and a plurality of load carriers,
   the work piece conveying apparatus including:
      a conveyor chain for conveying the load carriers via transfer of friction forces onto the load carriers, and
      a guiding rail for guiding and supporting the conveyor chain and the load carriers,
      the conveyer chain running in a recessed track of the guiding rail, and the guiding rail having a supporting surface laterally extending on both sides of the recessed track,
   each of the load carriers comprising:
      support rollers rolling on the supporting surface on both sides of the recessed track of the guiding rail; and
      a front guiding foot and a rear guiding foot engaging into the recessed track of the guiding rail, at least one of the guiding feet not contacting the conveyor chain such that the load carrier can be tilted between
         a first position in which only the at least one guiding foot does not contact the conveyor chain and in which the other of the guiding feet contacts the conveyor chain, and
         a second position in which none of the guiding feet contacts the conveyor chain.

14. The work piece conveyor system of claim 13, wherein complementary guiding surfaces are provided at the front guiding foot and at the rear guiding foot of each of the load carriers, the complementary guiding surfaces being designed and arranged for tilting each of the load carriers which is bumping onto another of the load carriers into its second position.

15. The work piece conveyor system of claim 13, wherein the guiding rail includes a extruded body made of aluminum and providing the recessed track, and runways forming the supporting surfaces for the supporting rollers on both sides of the recessed track, the runways being attached to the extruded body made of aluminum.

16. The work piece conveyor system of claim 15, wherein the runways are made of a wear resistant material.

17. The work piece conveyor system of claim 16, wherein the runways are made of steel.

18. The work piece conveyor system of claim 15, wherein the runways are made of a noise-reducing material.

19. The work piece conveyor system of claim 15, wherein the runways are exchangeably attached to the extruded body made of aluminum.

* * * * *